US006963917B1

United States Patent
Callis et al.

(10) Patent No.: US 6,963,917 B1
(45) Date of Patent: Nov. 8, 2005

(54) METHODS, SYSTEMS AND COMPUTER PROGRAM PRODUCTS FOR POLICY BASED DISTRIBUTION OF WORKLOAD TO SUBSETS OF POTENTIAL SERVERS

(75) Inventors: Gregory M. Callis, Morrisville, NC (US); Wesley McMillan Devine, Apex, NC (US); Jon Kevin Franks, Holly Springs, NC (US); Lap Thiet Huynh, Apex, NC (US); Alan G. Packett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 09/693,027

(22) Filed: Oct. 20, 2000

(51) Int. Cl.[7] .............................................. G06F 15/16
(52) U.S. Cl. .................. 709/227; 709/228; 709/105
(58) Field of Search ................ 709/228, 105, 709/201, 203, 313, 315, 229, 226, 227, 224, 223, 204; 370/229, 230; 714/11

(56) References Cited

U.S. PATENT DOCUMENTS

| | | | |
|---|---|---|---|
| 4,403,286 A | 9/1983 | Fry et al. ............. | 364/200 |
| 4,495,570 A | 1/1985 | Kitajima et al. ......... | 364/200 |
| 4,577,272 A | 3/1986 | Ballew et al. .......... | 364/200 |
| 5,031,089 A | 7/1991 | Liu et al. ............ | 364/200 |
| 5,341,477 A * | 8/1994 | Pitkin et al. ........... | 709/226 |
| 5,537,542 A | 7/1996 | Eilert et al. ........... | 709/201 |
| 5,563,878 A | 10/1996 | Blakeley et al. .......... | 370/60 |
| 5,603,029 A | 2/1997 | Aman et al. ........... | 718/105 |
| 5,675,739 A | 10/1997 | Eilert et al. ........... | 395/200 |
| 5,740,371 A | 4/1998 | Wallis .............. | 395/200.59 |

(Continued)

FOREIGN PATENT DOCUMENTS

EP 0648038 A2 8/1994 ......... H04L/29/06

OTHER PUBLICATIONS

Pai et al. *Locality–Aware Request Distribution in Cluster–based Network Servers.* Proceedings of the 8th International Conference on Architectural Support for Programming Languages and Operating Systems (ASPLOS VIII), San Jose, CA, Oct., 1998.

Aron et al. "Scalable Content–aware Request Distribution in Cluster–based Network Servers." Proc. of the 2000 Annual Usenix Technical Conference, San Diego, CA, Jun. 2000.

Aron et al. "Efficient Support for P–HTTP in Cluster–Based Web Servers." Proc. of 1999 Annual Usenix Technical Conference, Monterey, CA, Jun. 1999.

(Continued)

*Primary Examiner*—Marc D. Thompson
(74) *Attorney, Agent, or Firm*—Jerry W. Herndon; Myers, Bigel, Sibley & Sajovec, P.A.

(57) ABSTRACT

Methods, systems and computer program products according to embodiments of the present invention provide distributing workload between a plurality of data processing systems in a cluster of data processing systems, wherein each of the plurality of data processing systems is executing an instance of an application which communicates over a network such that a connection request to the application may be distributed to any one of the plurality of data processing systems. Such workload distribution may be provided by defining a subset of the plurality of data processing systems which are to receive connection requests to the application having at least one predefined characteristic. A request for a connection to the application is received over the network and it is determined if the request has a characteristic corresponding to the characteristic associated with the subset of the plurality of data processing systems. The request is distributed to a data processing system in the subset of the plurality of data processing systems if the request has a characteristic corresponding to the predefined characteristic.

30 Claims, 8 Drawing Sheets

U.S. PATENT DOCUMENTS

| | | | | |
|---|---|---|---|---|
| 5,754,752 | A | | 5/1998 | Sheh et al. ............. 395/182.02 |
| 5,774,660 | A | | 6/1998 | Brendel et al. ......... 395/200.31 |
| 5,774,668 | A | | 6/1998 | Choquier et al. ....... 395/200.53 |
| 5,796,936 | A | * | 8/1998 | Watabe et al. ................ 358/1.9 |
| 5,812,771 | A | | 9/1998 | Fee et al. .............. 395/200.31 |
| 5,828,847 | A | * | 10/1998 | Gehr et al. .................. 709/239 |
| 5,867,636 | A | | 2/1999 | Walker ........................ 395/114 |
| 5,867,661 | A | | 2/1999 | Bittinger et al. ............ 709/227 |
| 5,917,997 | A | | 6/1999 | Bell et al. .............. 395/182.02 |
| 5,918,017 | A | | 6/1999 | Attanasia et al. ....... 395/200.54 |
| 5,923,854 | A | | 7/1999 | Bell et al. .............. 395/200.73 |
| 5,935,215 | A | | 8/1999 | Bell et al. .................... 709/239 |
| 5,941,988 | A | | 8/1999 | Bhagwat et al. ............ 713/201 |
| 5,946,686 | A | * | 8/1999 | Schmuck et al. ............. 707/10 |
| 5,951,650 | A | | 9/1999 | Bell et al. .................... 709/238 |
| 5,951,694 | A | * | 9/1999 | Choquier et al. ............. 714/15 |
| 6,031,978 | A | | 2/2000 | Cotner et al. .......... 395/200.78 |
| 6,119,174 | A | | 9/2000 | Borowsky et al. ............ 710/15 |
| 6,128,279 | A | * | 10/2000 | O'Neil et al. ................ 370/229 |
| 6,141,759 | A | | 10/2000 | Braddy ........................ 713/201 |
| 6,223,205 | B1 | | 4/2001 | Harchol-Balter et al. ... 709/105 |
| 6,247,057 | B1 | | 6/2001 | Barrera, III ................. 709/229 |
| 6,252,878 | B1 | | 6/2001 | Locklear, Jr. et al. ....... 370/401 |
| 6,286,039 | B1 | | 9/2001 | Van Horne et al. ......... 709/221 |
| 6,314,463 | B1 | | 11/2001 | Abbott et al. ................ 709/224 |
| 6,317,786 | B1 | * | 11/2001 | Yamane et al. ............. 709/224 |
| 6,330,560 | B1 | | 12/2001 | Harrison et al. ................ 707/8 |
| 6,363,081 | B1 | | 3/2002 | Gase .......................... 370/466 |
| 6,374,300 | B2 | * | 4/2002 | Masters ...................... 709/229 |
| 6,430,622 | B1 | * | 8/2002 | Aiken et al. ................. 709/245 |
| 6,445,704 | B1 | | 9/2002 | Howes et al. ................ 370/392 |
| 6,446,225 | B1 | | 9/2002 | Robsman et al. ............. 714/55 |
| 6,542,926 | B2 | | 4/2003 | Zalewski et al. ........... 709/213 |
| 6,578,066 | B1 | | 6/2003 | Logan et al. ................ 709/105 |
| 6,587,866 | B1 | * | 7/2003 | Modi et al. .................. 709/105 |
| 6,591,262 | B1 | * | 7/2003 | MacLellan et al. ............ 707/2 |
| 6,594,268 | B1 | | 7/2003 | Aukia et al. ................. 370/400 |
| 6,606,315 | B1 | | 8/2003 | Albert et al. ................ 370/352 |
| 6,650,641 | B1 | | 11/2003 | Albert et al. ................ 370/392 |
| 6,657,974 | B1 | | 12/2003 | Britton et al. ............... 370/216 |
| 6,701,377 | B2 | | 3/2004 | Burmann et al. ........... 709/249 |
| 6,704,317 | B1 | | 3/2004 | Dobson ....................... 370/401 |
| 6,718,383 | B1 | | 4/2004 | Hebert ........................ 709/224 |
| 2002/0010783 | A1 | | 1/2002 | Primak et al. .............. 709/228 |
| 2002/0091831 | A1 | | 7/2002 | Johnson ...................... 709/227 |
| 2002/0124089 | A1 | | 9/2002 | Aiken, Jr. et al. .......... 709/227 |
| 2002/0166080 | A1 | | 9/2002 | Aiken, Jr. et al. .......... 709/227 |
| 2002/0143953 | A1 | | 10/2002 | Aiken, Jr. et al. .......... 709/227 |
| 2002/0143954 | A1 | | 10/2002 | Aiken, Jr. et al. .......... 709/227 |
| 2002/0178265 | A1 | | 11/2002 | Aiken, Jr. et al. .......... 709/227 |
| 2002/0178268 | A1 | | 11/2002 | Aiken, Jr. et al. .......... 709/228 |
| 2002/0199000 | A1 | | 12/2002 | Banerjee ..................... 709/227 |
| 2003/0061402 | A1 | | 3/2003 | Yadav ......................... 709/328 |
| 2003/0079146 | A1 | | 4/2003 | Burstein ..................... 713/201 |
| 2003/0202536 | A1 | | 10/2003 | Foster et al. ................ 370/469 |

OTHER PUBLICATIONS

Aron, Mohit. "Scalable Content–aware Request Distribution in Cluster–based Network Servers." http://softlib.rice.edu/softlib/scalableRD.html. Department of Computer Science, Rice University.

"Data Communications Awards Allot Communications 'Hot Product' in Internetworking/IP Tools Category." Press Bulletin. Los Gatos, CA, Jan. 18, 1999.

"Allot Introduces Turnkey Next Generation IP Service and Creation Solution—the Virtual Bandwidth Manager." Press Bulletin. Atlanta, GA, SUPERCOMM 2000, Booth #8458, Jun. 5, 2000.

"Allot Announces the General Availability of its Directory Services–Based NetPolicy™ Manager." Press Bulletin. Tel Aviv, Israel, Feb. 28, 2000.

"Allot Communications Announces the Netenforcer Family of IP Traffic Management Products: Fault–Tolerant, Scaleable, Policy–Based Bandwidth Management, QOS, SLA Solutions." Press Bulletin. Burlingame, CA, Dec. 13, 1999.

"Allot Communications Announces Business–Aware Network Policy Manager." Press Bulletin. Sophia Antipolis, France, Sep. 20, 1999.

"Allot Communications Announces Directory Services Based Network Policy Manager." Press Bulletin. Los Gatos, CA, Apr. 5, 1999.

"Allot Communications Launches NetEnforcer with NetWizard, the Fastest Way to Implement Accurate and Reliable Network QoS Policies." Press Bulletin. Burlingame, CA, Jan. 25, 2001.

"Policy–Based Network Architecture." from www.allot.com pp. 1–11.

U.S. Appl. No. 09/693,663, filed Oct. 20, 2000.

U.S. Appl. No. 09/640,409, filed Aug. 17, 2000.

U.S. Appl. No. 09/640,438, filed Aug. 17, 2000.

U.S. Appl. No. 09/640,412, filed Aug. 17, 2000.

A. Dahlin, et al. *EDDIE A Robust and Scalable Internet Server.* Ericsson Telecom AB, Stockholm, Sweden, pp. 1–7 (May 1998).

Brochure entitled, *ACEdirector™ 8–Port 10/100 MBPS Ethernet Switch.* Alteon WebSystems, San Jose, CA (1999).

Brochure entitled, *Enhancing Web User Experience with Global Server Load Balancing.* Alteon WebSystems, San Jose, CA (Jun. 1999).

Brochure entitled, *The Next Step in Server Load Balancing.* Alteon WebSystems, San Jose, CA (Nov. 1999).

Mac Devine. Presentation entitled, *TCP/IP Application Availability and Workload Balancing in the Parallel Sysplex.* Share Technical Conference (Aug. 22–27, 1999).

http://w3.enterlib.ibm.com:80/cgi–bin/bookmgr/books/F1AF7001/1.3.1.2; 1.3.1.2.5 Virtual IP Addressing (VIPA); Excerpt from IP Configuration for OS/390, pp. 1–4 (1998).

http://w3.enterlib.ibm.com:80/cgi–bin/bookmgr/books/F1AF7001/1.3.2; 1.3.20 DEVICE and LINK Statement—Virtual Devices (VIPA); Excerpt from IP Configuration for OS/390, pp. 1–3 (1998).

http://w3.enterlib.ibm.com:80/cgi–bin/bookmgr/books/F1AF7001/1.3.2; 1.3.23. HOME Statement; Excerpt from IP Configuration for OS/390, pp. 1–6 (1998).

* cited by examiner

METHODS, SYSTEMS AND COMPUTER PROGRAM PRODUCTS FOR POLICY BASED DISTRIBUTION OF WORKLOAD TO SUBSETS OF POTENTIAL SERVERS

RELATED APPLICATIONS

The present application is related to concurrently filed and commonly assigned U.S. patent application Ser. No. 09/693,663, entitled "METHODS, SYSTEMS AND COMPUTER PROGRAM PRODUCTS FOR WORKLOAD DISTRIBUTION BASED ON END-TO-END QUALITY OF SERVICE", the disclosure of which is incorporated herein by reference as if set forth fully herein.

FIELD OF THE INVENTION

The present invention relates to network communications and more particularly to workload distribution within a cluster of data processing systems communicating over a network.

BACKGROUND OF THE INVENTION

Scalability and load balancing in network servers are issues which have received considerable attention in light of the expansion of the Internet. For example, it may be desirable to have multiple servers servicing customers. The workload of such servers may be balanced by providing a single network visible Internet Protocol (IP) address which is mapped to multiple servers.

Such a mapping process may be achieved by, for example, network address translation (NAT) facilities, dispatcher systems and Dynamic Name Server/WorkLoad Management (DNS/WLM) systems from International Business Machines Corporation (IBM), Armonk, N.Y. These various mechanisms for allowing multiple servers to share a single IP address are illustrated in FIGS. 1 through 3.

Figure 1:
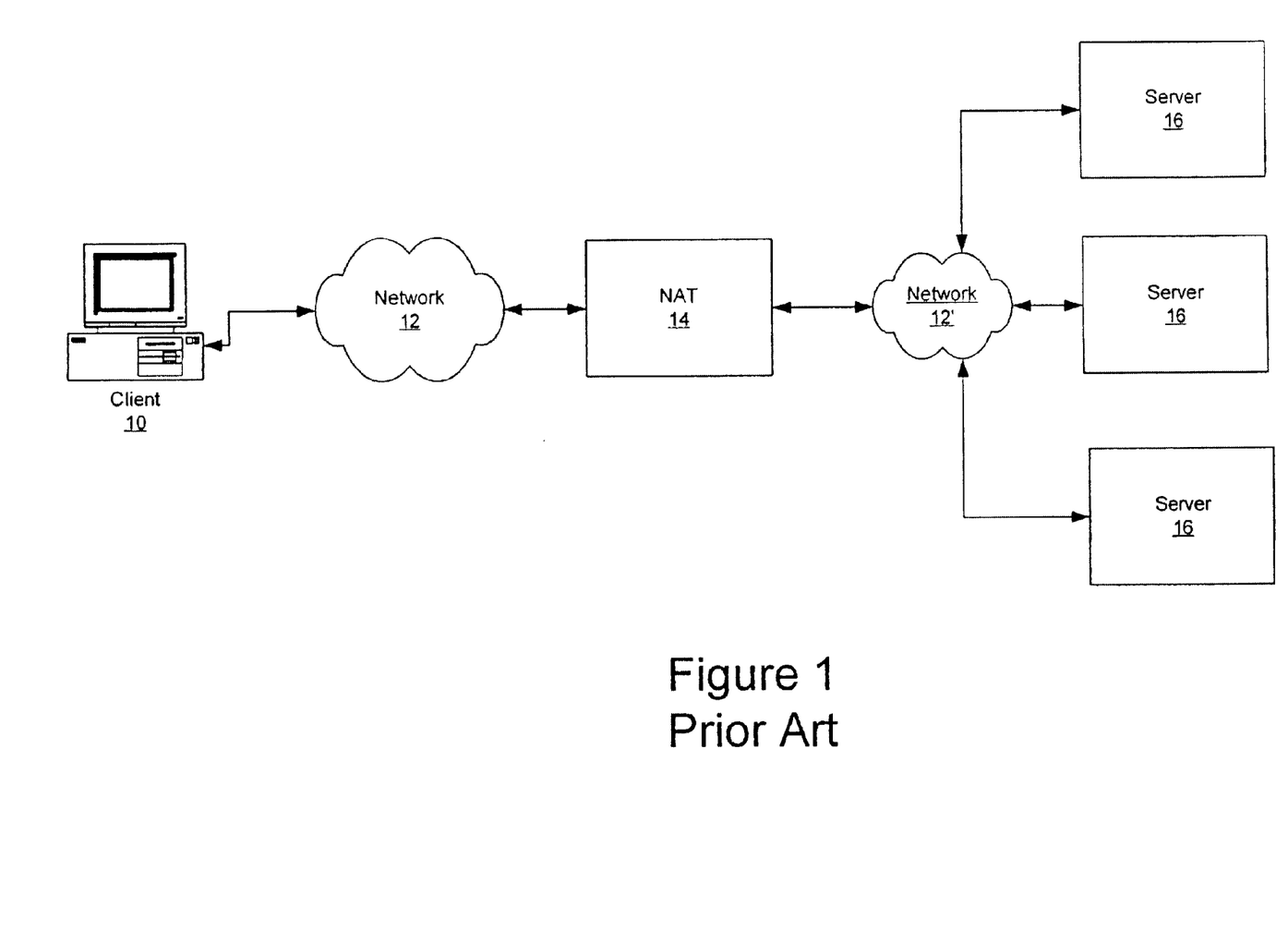
FIG. 1 is block diagram of a conventional network address translation system.

FIG. 1 illustrates a conventional network address translation system as described above. In the system of FIG. 1, a client 10 communicates over a network 12 to a network address translation (NAT) system 14. The network address translation system receives the communications from the client 10 and converts the communications from the addressing scheme of the network 12 to the addressing scheme of the network 12' and sends the messages to the servers 16. A server 16 may be selected from multiple servers 16 at connect time and may be on any host, one or more hops away. All inbound and outbound traffic flows through the NAT system 14.

Figure 2:
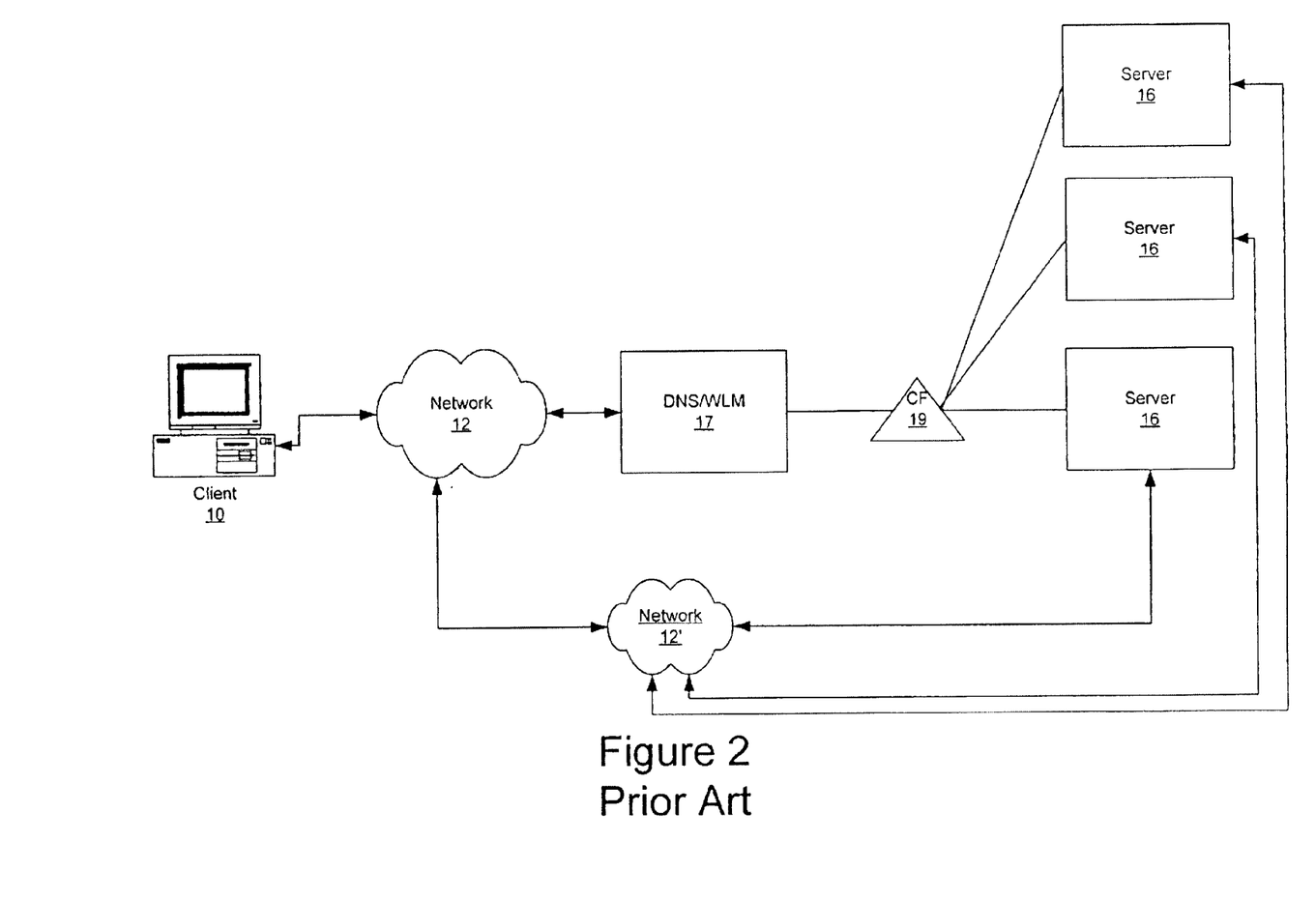
FIG. 2 is block diagram of a conventional DNS/WLM system.

FIG. 2 illustrates a conventional DNS/WLM system as described above. The server 16 is selected at name resolution time when the client 10 resolves the name for the destination server from the DNS/WLM system 17 which is connected to the servers 16 through the coupling facility (CF) 19. The DNS/WLM system 17 of FIG. 2 relies on the client 10 adhering to a "zero time to live" lifetime for IP addresses such that IP addresses are not cached by the client.

Figure 3:
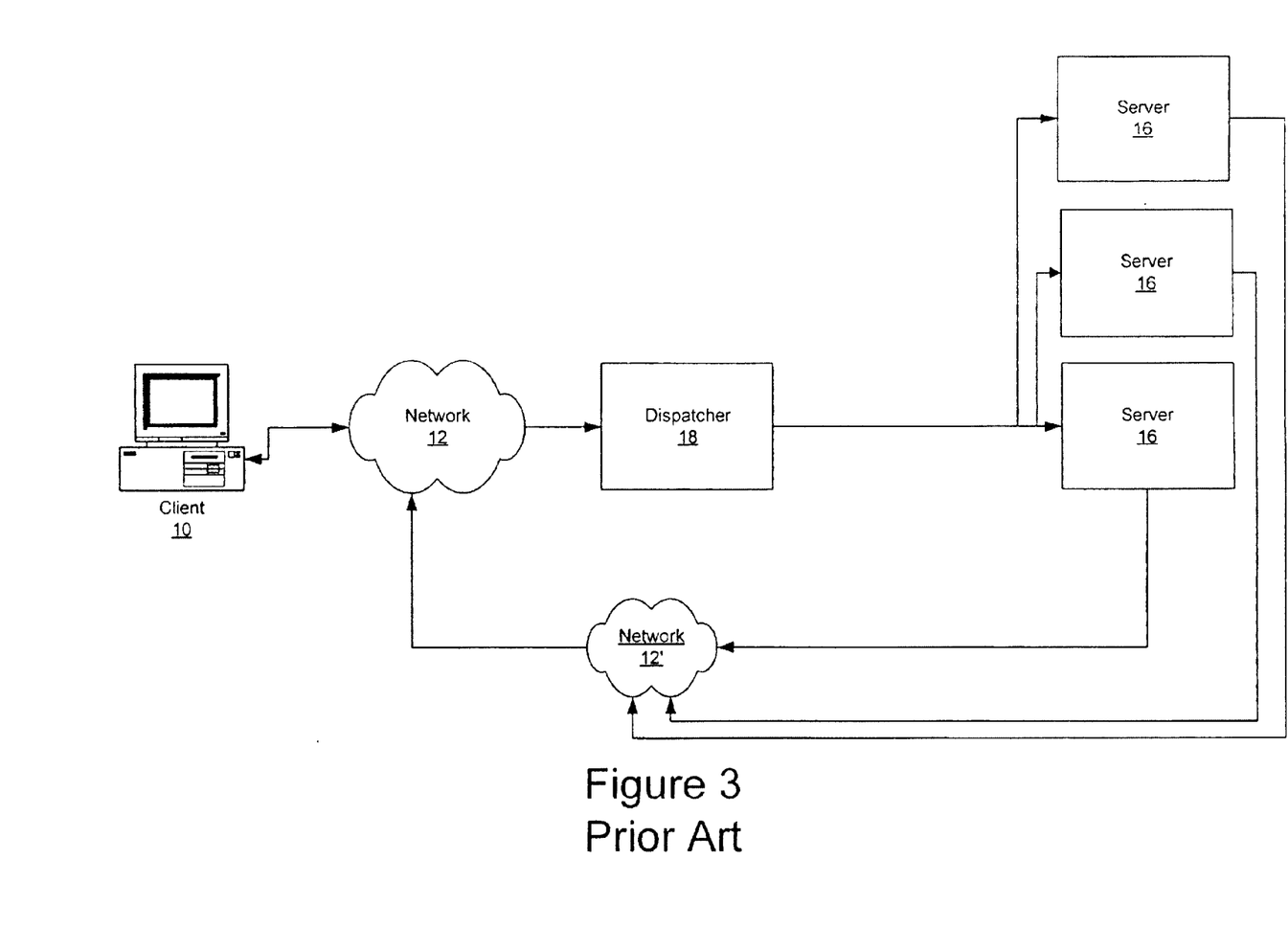
FIG. 3 is block diagram of a conventional dispatcher system.

FIG. 3 illustrates a conventional dispatcher system. As seen in FIG. 3, the client 10 communicates over the network 12 with a dispatcher system 18 to establish a connection. The dispatcher routes inbound packets to the servers 16 and outbound packets are sent over network 12' but may flow over any available path to the client 10. The servers 16 are typically on a directly connected network to the dispatcher 18 and a server 16 is selected at connect time.

Such a dispatcher system is illustrated by the Interactive Network Dispatcher function of the IBM 2216 and AIX platforms. In these systems, the same IP address that the Network Dispatcher node 18 advertises to the routing network 12 is activated on server nodes 16 as loopback addresses. The node performing the distribution function connects to the endpoint stack via a single hop connection because normal routing protocols typically cannot be used to get a connection request from the endpoint to the distributing node if the endpoint uses the same IP address as the distributing node advertises. Network Dispatcher uses an application on the server to query a workload management function (such as WLM of System/390), and collects this information at intervals, e.g. 30 seconds or so. Applications running on the Network Dispatcher node 18 can also issue "null" queries to selected application server instances as a means of determining server instance health.

In addition to the above described systems, Cisco Systems offers a Multi-Node Load Balancing function on certain of its routers that performs the distribution function. Such operations appear similar to those of the IBM 2216.

Finally, in addition to the system described above, Ace-Director from Alteon provides a virtual IP address and performs network address translation to a real address of a selected server application. AceDirector appears to observe connection request turnaround times and rejection as a mechanism for determining server load capabilities.

SUMMARY OF THE INVENTION

Methods, systems and computer program products according to embodiments of the present invention provide for distributing workload between a plurality of data processing systems in a cluster of data processing systems, wherein each of the plurality of data processing systems is executing an instance of an application which communicates over a network such that a connection request to the application may be distributed to any one of the plurality of data processing systems. A subset of the plurality of data processing systems is defined which are to receive connection requests to the application having at least one predefined characteristic. A request for a connection to the application is received over the network and it is determined if the request has a characteristic corresponding to the characteristic associated with the subset of the plurality of data processing systems. The request is distributed to a data processing system in the subset of the plurality of data processing systems if the request has a characteristic corresponding to the predefined characteristic.

In further embodiments of the present invention, the request is distributed to a data processing system of the plurality of data processing systems other than one in the subset of data processing systems if the request does not have a characteristic corresponding to the predefined characteristic. The characteristic may be a client identification associated with the request which may be a source address of a request.

In still further embodiments of the present invention, the availability of data processing systems in the subset of the plurality of data processing systems is determined. It is also determined if the availability of at least one of the data processing systems in the subset of the plurality of data processing systems meets an availability criteria. If so, the request is distributed to a data processing system in the subset of the plurality of data processing systems which meets the availability criteria.

Furthermore, the request may be distributed to a data processing system of the plurality of data processing systems other than a data processing system in the subset of data processing systems if the request has a characteristic corresponding to the predefined characteristic and none of the subset of the plurality of data processing systems have an availability which meets the availability criteria. Alternatively, the request may be rejected if the request has a characteristic corresponding to the predefined characteristic of the subset of the plurality of data processing systems and none of the subset of the plurality of data processing systems have an availability which meets the availability criteria.

In still further embodiments of the present invention, an availability of data processing systems other than data processing systems in the subset of data processing systems is determined. The request is distributed to a data processing system of the plurality of data processing having the best availability if the request has a characteristic corresponding to the at least one predefined characteristic of the subset of the plurality of data processing systems and none of the subset of the plurality of data processing systems have an availability which meets the availability criteria.

In additional embodiments of the present invention, a subset of the plurality of data processing systems may be defined which includes data processing systems having common operational characteristics. The data processing systems may be communication protocol stacks in an OS/390 Sysplex to which the application is bound. In such embodiments, the subset of the plurality of data processing systems may be a subset of the communication protocol stacks bound to the application. Furthermore, the distribution of the requests may be provided by a routing communication protocol stack.

As will further be appreciated by those of skill in the art, the present invention may be embodied as methods, apparatus/systems and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code embodied in the medium for use by or in connection with an instruction execution system. In the context of this document, a computer-usable or computer-readable medium can be any structure that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

The present invention can be embodied as systems, methods, or computer program products which allow for workload distribution between a plurality of communication protocol stacks in a cluster of data processing systems. While embodiments of the present invention may be incorporated into any routing based workload distribution system, in particular embodiments of the present invention, workload is distributed by routing protocol stacks which associate a Virtual IP Address (VIPA) and port with other communication protocol stacks in the cluster. The routing communication protocol stacks route communications to the VIPA and port to the appropriate communication protocol stack. VIPAs capable of being shared by a number of communication protocol stacks are referred to herein as "dynamic routable VIPAs" (DVIPA). Workload distribution according to embodiments of the present invention may be accomplished in such routing communication protocol stacks during the selection process when a connection using the DVIPA is established.

Particular preferred systems in which embodiments of the present invention may be utilized are described in commonly assigned U.S. patent application Ser. No. 09/640,412, entitled, "METHODS, SYSTEMS AND COMPUTER PROGRAM PRODUCTS FOR NON-DISRUPTIVELY TRANSFERRING A VIRTUAL INTERNET PROTOCOL ADDRESS BETWEEN COMMUNICATION PROTOCOL STACKS", U.S. patent application Ser. No. 09/640,409, entitled "METHODS, SYSTEMS AND COMPUTER PROGRAM PRODUCTS FOR CLUSTER WORKLOAD DISTRIBUTION", U.S. patent application Ser. No. 09/640, 438, entitled "METHODS, SYSTEMS AND COMPUTER PROGRAM PRODUCTS FOR FAILURE RECOVERY FOR ROUTED VIRTUAL INTERNET PROTOCOL ADDRESSES" all filed Aug. 17, 2000, and U.S. patent application Ser. No. 09/401,419 entitled "METHODS, SYSTEMS AND COMPUTER PROGRAM PRODUCTS FOR AUTOMATED MOVEMENT OF IP ADDRESSES WITHIN A CLUSTER" filed Sep. 22, 1999, the disclosures of which are each incorporated herein by reference as if set forth fully herein.

Figure 4:
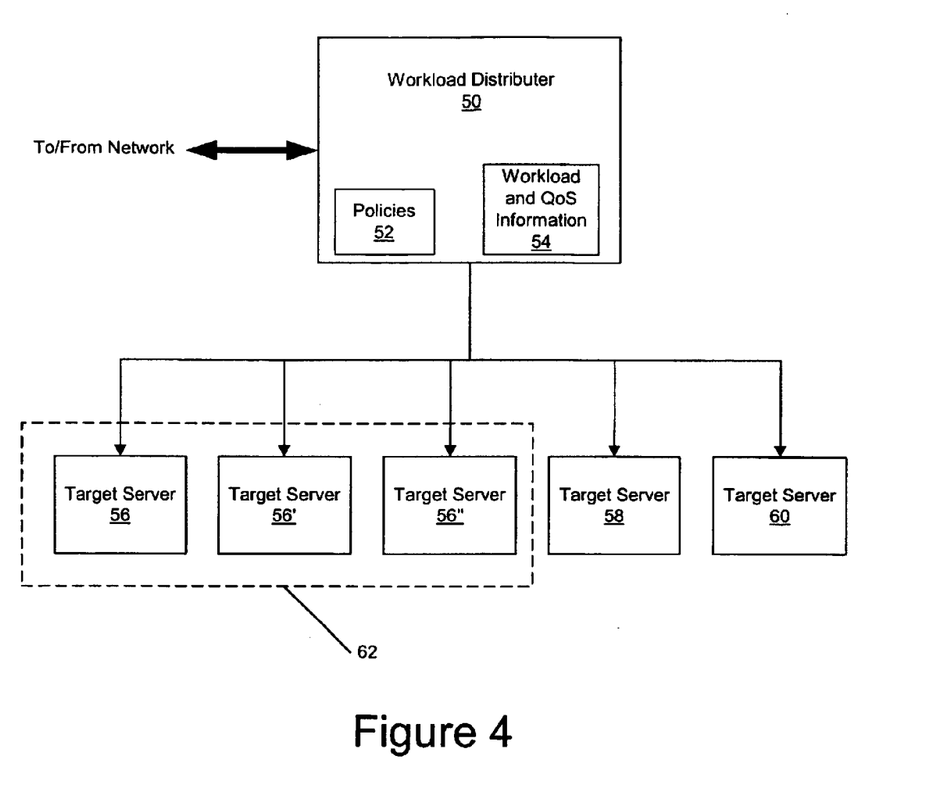
FIG. 4 is a block diagram illustrating embodiments of the present invention.

A system incorporating embodiments of the present invention is illustrated in FIG. 4. As seen in FIG. 4, a workload distributer 50 communicates with a network so as to receive connection requests for connections to applications executing on data processing systems (target servers) in a cluster of data processing systems. The workload distributer 50 distributes the connection requests to data processing systems which are executing an application for which the connection is requested, such as the target servers 56, 56', 56", 58 and 60 which are each executing an instance of a common application. Other data processing systems may be included in the cluster which are executing other applications, however, for clarity of illustration, these data processing systems are not shown in FIG. 4. Furthermore, the target servers may be executing instances of other applications as well as different servers may be executing different applications. Workload distribution may also be carried out according to the teachings of the present invention for these other applications, however, for purposes of clarity the examples of the present invention are described with reference to one application.

As is further illustrated in FIG. 4, the workload distributer may distribute connection requests to the application executing on the target servers 56, 56', 56", 58 and 60 utilizing the workload and quality of service information 54 and utilizing workload distribution policies 52. The workload distribution policies 52 may serve to establish subsets of available servers for a connection request to an application which are associated with one or more characteristics of the connection request. As used herein, the term "available servers" refers to those servers for which the workload distributer 50 distributes connection requests which are capable of handling a particular connection request. Furthermore, the term "server" is used herein generally to refer to an entity capable of executing an application for which connections may be requested and which may be a target for distribution of connection requests by the workload distributer 50. Thus, examples of "servers" may include a data processing system or operating system executing on a data processing system if multiple operating system images may execute on a single data processing system. For example, in a data processing system having multiple communication protocol stacks, if each communication protocol stack may receive connections, then each such communication protocol stack may be treated as a distinct "server" for purposes of workload distribution.

Thus, for example, a policy may establish a subset 62 including target servers 56, 56' and 56" of the total potential target servers 56, 56', 56", 58 and 60 for an application. The subset 62 may be associated with one or more connection characteristics, such as the identity of the client requesting the connection, such that connection requests having the one or more characteristics are preferentially distributed by the workload distributer 50 to the target servers 56, 56' and 56" in the subset 62. Any characteristic which may be determined from the connection request and which may provide the basis for distinguishing between requests based on the characteristic may be utilized in determining if a connection request should be preferentially routed to a subset of the data processing systems. For example, application level information, such as information available above the TCP/IP layer (e.g. "layer 7" information), source Internet Protocol address, data payload type, client identifiers, security protocols or other such characteristics of the connection request may be utilized.

Furthermore, in certain embodiments of the present invention, the target servers 56, 56' and 56" may be selected from the total potential target servers 56, 56', 56", 58 and 60 for inclusion in the subset 62 based on common operational characteristics or based on having operational characteristics which fall within a common range. Examples of operational characteristics which may be used to group data processing systems into subsets may include processing capabilities such as content location, processing speed, available memory or other performance criteria, communication capabilities, such as total available bandwidth, connection speed, connection type or the like, security issues or even ownership issues such as ownership and/or control of the data processing systems. In fact, subsets could be dynamically established based on real-time capabilities of particular servers (e.g., servers with excess capacity may form a group to serve premium users etc.)

By allowing policies to preferentially direct or even to restrict the potential target servers to a subset of the total, differentiation between individual requests may be provided. Thus, for example, different service levels may be provided by evaluating requests and providing requests to subsets of available servers based on the service level indicated by the characteristics of a request.

In one example, if the servers are application service providers, then different levels of performance could be sold to different customers. These different performance levels may be associated with different subsets of application servers. Requests for connections to an application server could be evaluated to determine the performance level that a customer corresponding to the requesting client paid for and the connection assigned to the subset of application servers associated with that performance level. Similarly, in an e-commerce system, types of transactions could be segregated such that connections associated with purchases were handled by higher performance machines than those associated with browsing of an on-line catalog.

Furthermore, different subsets of servers may be utilized based on the type of data associated with the connection. For example, if a connection request was for a connection to provide streaming audio or video a different subset of servers may be used than if the connection is for the download of a data file.

Additionally, when different types of devices request connections, the type of device requesting the connection could be used to select a subset of servers. For example, a subset of processors with low processing performance could be assigned to wireless devices which have lower bandwidth communication capabilities. Connections requested by desktop systems with higher bandwidth communication capabilities could result in the selection of a subset of servers with higher processing performance. As is seen from the above discussion, embodiments of the present invention may be used in a variety of situations and/or environments with subsets of servers selected in a different manner based on the particular situation and/or environment.

Figure 5:
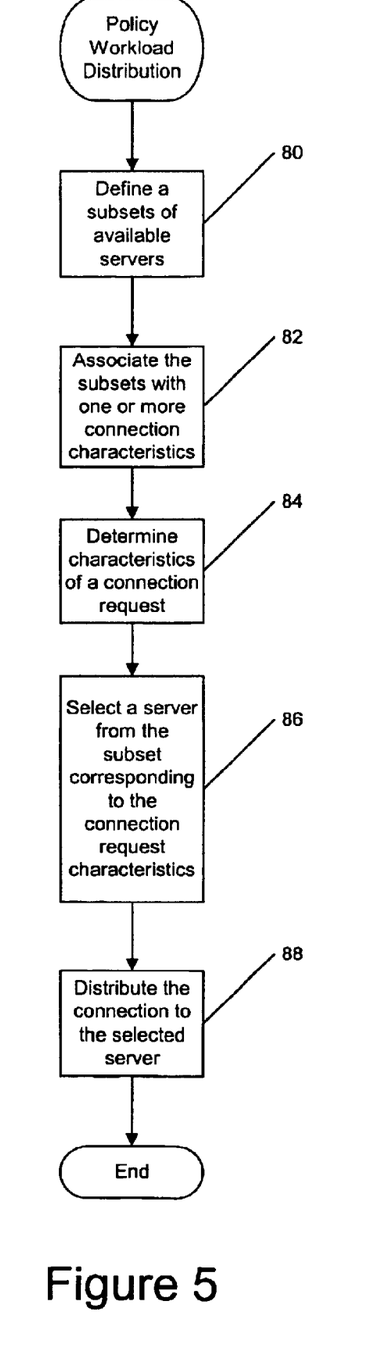
FIG. 5 is a flowchart illustrating operations according to embodiments of the present invention.

Operations of the workload distributer 50 according to embodiments of the present invention will now be described with reference to FIG. 5. The workload distributer 50 defines a subset of available servers for connections to an application (block 80). Such a definition may be based on the policies 52 of the workload distributer 50. The subsets of available servers are associated with one or more characteristics of connection requests (block 82). Such an association may also be provided by the policies 52. Furthermore, the characteristics of connection requests may be as described above.

When a connection request is received, the connection request is evaluated to determine the characteristics of the connection request (block 84). Such an evaluation may take different forms based on the characteristics which are to be evaluated. For example, the evaluation may be evaluating the source IP address of the connection request or may be evaluating the data payload to determine the type of data for which the connection is requested (e.g., streaming video, streaming audio, file download, etc.).

Based on the determined characteristics of the connection request (block 84), the workload distributer 50 selects a server from the subset 62 of servers corresponding to the characteristics of the connection request (block 86). The connection request is distributed by the workload distributer 50 to the selected server (block 88).

Figure 6:
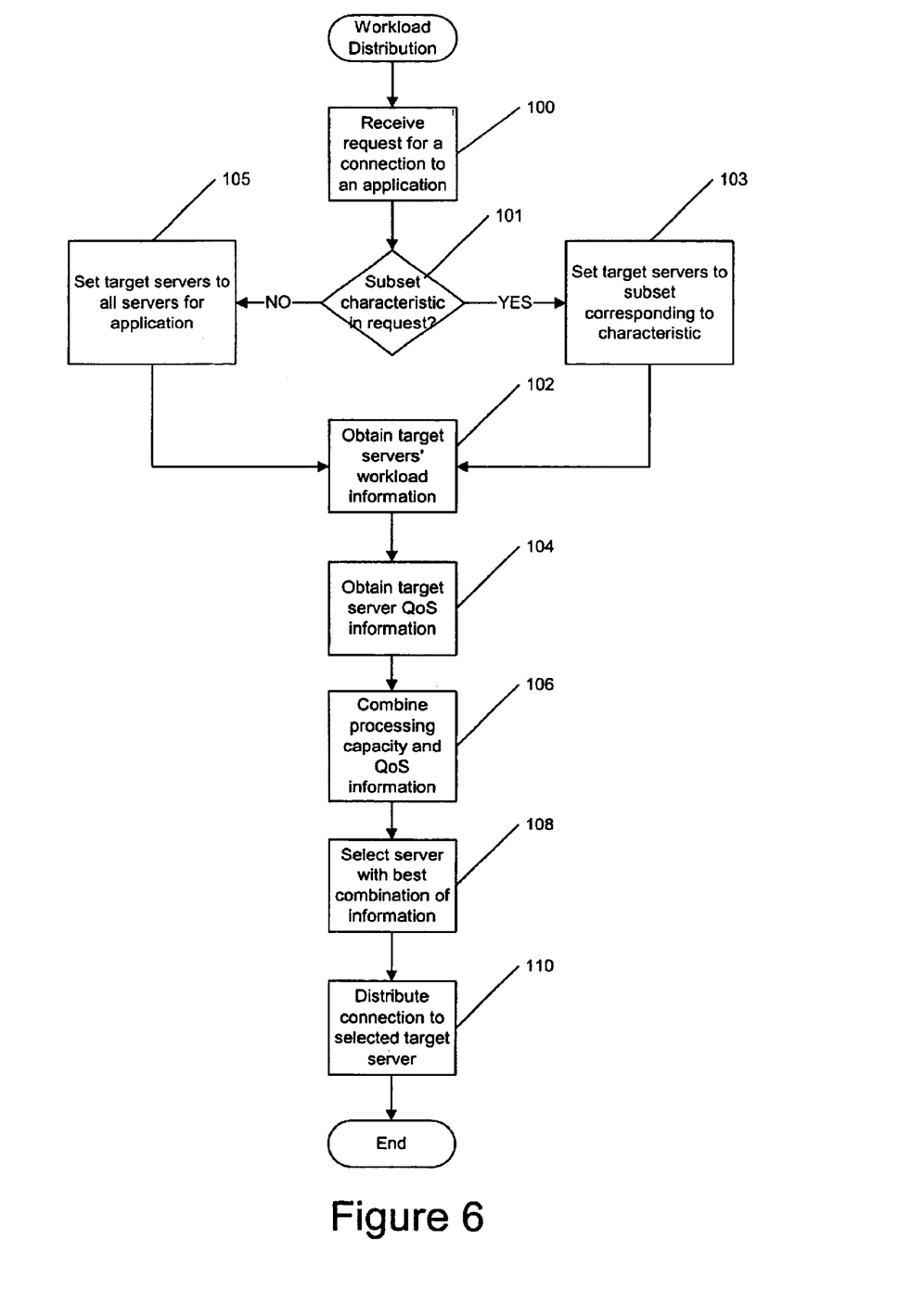
FIG. 6 is a flowchart illustrating operations according to embodiments of the present invention.

Operations according to embodiments of the present invention which utilize policies 52 and workload and QoS information 54 will now be described with reference to FIG. 6. As seen in FIG. 6, a request for a connection to an application executing on data processing systems in a cluster of data processing systems is received (block 100). For example, the request may be received by the workload distributer 50. The connection request is evaluated to determine if the request has a characteristic which is associated with a subset of the data processing systems executing the application (block 101). If the connection request has a characteristic which is associated with a subset of the data processing systems executing the application (block 101), then that subset of the data processing systems is set as the target servers (block 103). If the connection request does not have a characteristic which is associated with a subset of the data processing systems executing the application (block 101), then all available servers may be set as the target servers (block 105).

Workload information, such as an indication of the processing capacity utilization of the target servers in the cluster of data processing servers, is obtained (block 102) as well as QoS information for the target servers (block 104). The QoS information may be obtained on a server basis or for connections having constraints in common with the requested connection (e.g. a common QoS level). The processing capacity utilization information and the QoS information may be utilized (block 106) to provide a workload metric for use in selecting a target server for the connection. The target server having the best or a sufficiently satisfactory workload metric is selected (block 108) and the connection request is distributed to the selected target server (block 110). Alternatively, if no target servers in the subset are available, the connection request could be distributed to target servers outside the subset of target servers.

The QoS information utilized in the workload distribution preferably includes QoS information such as packet loss information, timeout information and/or connection usage information. Other suitable QoS measurements may also be utilized. The QoS measurements may be ratios, such as a packet loss ratio, a timeout ratio, or a connection utilization ratio, which may be used directly or may be weighted. Workload information may, for example, be provided as a workload weight (W) which expresses the utilization of capacity for a target server as a range of values. For example, the IBM WorkLoad Manager (WLM) provides an integer value from 0 to 64 with 64 being the highest availability capacity. Such workload values may represent the capacity of the server, the application, other critical resources of the server or combinations thereof. Furthermore, while the combination of QoS information and processor capacity utilization information is described above as being performed as a separate operation, as will be appreciated by those of skill in the art, such operations need not produce an intermediate result but may be combined in a single operation.

Figure 7:
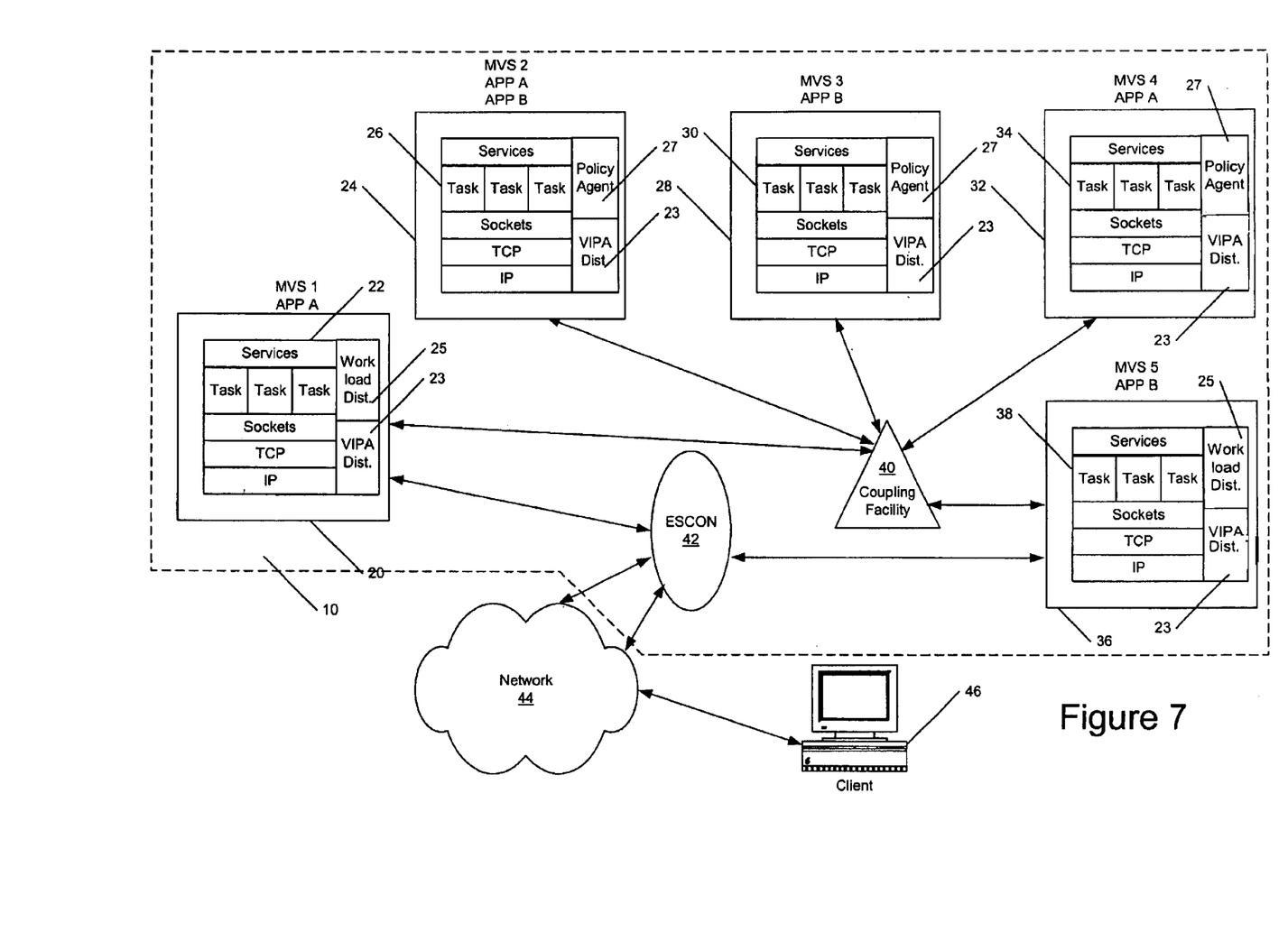
FIG. 7 is block diagram of a cluster of data processing systems incorporating embodiments of the present invention.

Particular embodiments of the present invention will now be described with reference to FIGS. 7 and 8 which illustrate embodiments of the present invention in a Sysplex cluster. A cluster of data processing systems is illustrated in FIG. 7 as cluster nodes in the Sysplex 10. As seen in FIG. 7, several data processing systems 20, 24, 28, 32 and 36 are interconnected in a Sysplex 10. The data processing systems 20, 24, 28, 32 and 36 illustrated in FIG. 7 may be operating system images, such as MVS images, executing on one or more computer systems. While the present invention will be described primarily with respect to the MVS operating system executing in a System/390 environment, the data processing systems 20, 24, 28, 32 and 36 may be mainframe computers, mid-range computers, servers or other systems capable of supporting workload distribution based on workload and end-to-end connection QoS information as described herein.

As is further illustrated in FIG. 7, the data processing systems 20, 24, 28, 32 and 36 have associated with them communication protocol stacks 22, 26, 30, 34 and 38, which may be TCP/IP stacks. The communication protocol stacks 22, 26, 30, 34 and 38 incorporate a VIPA distribution function 23 as described in the above reference United States patent applications. Furthermore, the communication protocol stacks 22 and 38 function as routing communication protocol stacks and, therefore, also incorporate a workload distribution function 25 which may function as a workload distributer and which may work in cooperation with the VIPA distribution function 23 so as to distribute DVIPA connections among target communication protocol stacks based on resource availability and end-to-end QoS information. The communication protocol stacks 26, 30 and 34 function as server communication protocol stacks and, therefore, include a policy agent 27 which provides QoS information to the workload distribution function 25. If a communication protocol stack functions as both a server stack and a routing stack, then the workload distribution function 25 may perform the functions of the policy agent 27 or a policy agent 27 may also be provided on these stacks.

While each of the communication protocol stacks 22, 26, 30, 34 and 38 illustrated in FIG. 7 incorporate the VIPA distribution function 23 and either a workload distribution function 25 or a policy agent 27, not all communication protocol stacks in a Sysplex need incorporate these functions. Thus, the present invention may be carried out on any system where two or more communication protocol stacks in a cluster of data processing systems support workload distribution and dynamic routable VIPAs. If a communication protocol stack does not support workload distribution and dynamic routable VIPAs, then the workload distribution and dynamic routable VIPA messages according to the present invention could be ignored by the communication protocol stack. Thus, the present invention may provide backward compatibility with existing communication protocol stacks.

As is further seen in FIG. 7, the communication protocol stacks 22, 26, 30, 34 and 38 may communicate with each other through a coupling facility 40 of the Sysplex 10, for example, utilizing XCF messaging. Furthermore, the communication protocol stacks 22 and 38 may communicate with an external network 44 such as the Internet, an intranet, a Local Area Network (LAN) or Wide Area Network (WAN) utilizing the Enterprise System Connectivity (ESCON) 42. Thus, a client 46 may utilize network 44 to communicate with an application executing on an MVS image in Sysplex 10 through the communication protocol stacks 22 and 38 which may function as routing protocol stacks as described herein.

As an example of utilization of the present invention, for illustration purposes, data processing system 20 has associated with it communication protocol stack 22 which is associated with MVS image MVS 1 which has application APP A executing on MVS image MVS 1 and utilizing communication protocol stack 22 to allow access to, for example, client 46 through network 44. Similarly, data processing system 24 has associated with it communication protocol stack 26 which is associated with MVS image MVS 2 which has a second instance of application APP A and an instance of application APP B executing on MVS image MVS 2 which may utilize communication protocol stack 26 for communications. Data processing system 28 has associated with it communication protocol stack 30 which is associated with MVS image MVS 3 which has a second instance of application APP B executing on MVS image MVS 3 which may utilize communication protocol stack 30 for communications. Data processing system 32 has associated with it communication protocol stack 34 which is associated with MVS image MVS 4 which has a third instance of application APP A executing on MVS image MVS 4 which may utilize communication protocol stack 34 for communications. Finally, data processing system 36 has associated with it communication protocol stack 38 which is associated with MVS image MVS 5 which has a third instance of application APP B executing on MVS image MVS 5 which may utilize communication protocol stack 38 for communications.

As is illustrated in FIG. 7, a communication protocol stack may be both a routing communication protocol stack and a server communication protocol stack. Communication protocol stacks 22, 26 and 34 may function as server communication protocol stacks for the application APP A. Likewise, the communication protocol stacks 26, 30 and 38 may function as server communication protocol stacks for the application APP B. In the present example, communication protocol stacks 22 and 26 may be defined as a subset of the available communication protocol stacks 22, 26 and 34 for application APP A and may be associated with particular (for example, based on source IP address) clients requesting connections to APP A.

Utilizing the above described system configuration as an example, the workload distribution function 25 utilizing the VIPA distribution function 23 will now be described. The VIPA distribution function 23 allows for protocol stacks which are defined as supporting DVIPAs to share the DVIPA and communicate with the network 44 through a routing protocol stack such that all protocol stacks having a server application which is associated with the DVIPA may appear to the network 44 as a single IP address. Such dynamically routable VIPAs may be provided by designating a protocol stack, such as protocol stack 22, as a routing protocol stack, notifying other protocol stacks of the routing protocol stack and having other protocol stacks notify the routing protocol stack when an application which binds to the DVIPA is started. Because communications to the DVIPA are routed through the routing protocol stack, the routing protocol stack may provide work load balancing based on policies which define subsets of target communication protocol stacks through the workload distribution function 25 by distributing connections to selected ones of the protocol stacks on MVS images executing server applications which bind to the DVIPA to balance workload. The VIPA distribution function 23 allows automated movement of a routing protocol function to a backup stack and allows recovery of a failed routing stack without disruption to connections through the backup stack. In such cases, the workload distribution function 25 would also be moved or recovered on the backup stack.

For the present example, application APP A is associated with DVIPA VA1 which may be associated with the respective first, second and third instances of APP A. Application APP B, likewise, has DVIPA VB1 associated with the respective first, second and third instances of APP B.

Returning to the example illustrated in FIG. 7, the communication protocol stacks 22, 26, 30, 34 and 38 may be configured as to which stacks are routing stacks, backup routing stacks and server stacks as described in the above referenced United States patent applications. The workload distribution functions 25 for routing communication protocol stacks which utilize policies which define subsets of available target communication protocol stacks may perform the operations illustrated in FIG. 8.

Figure 8:
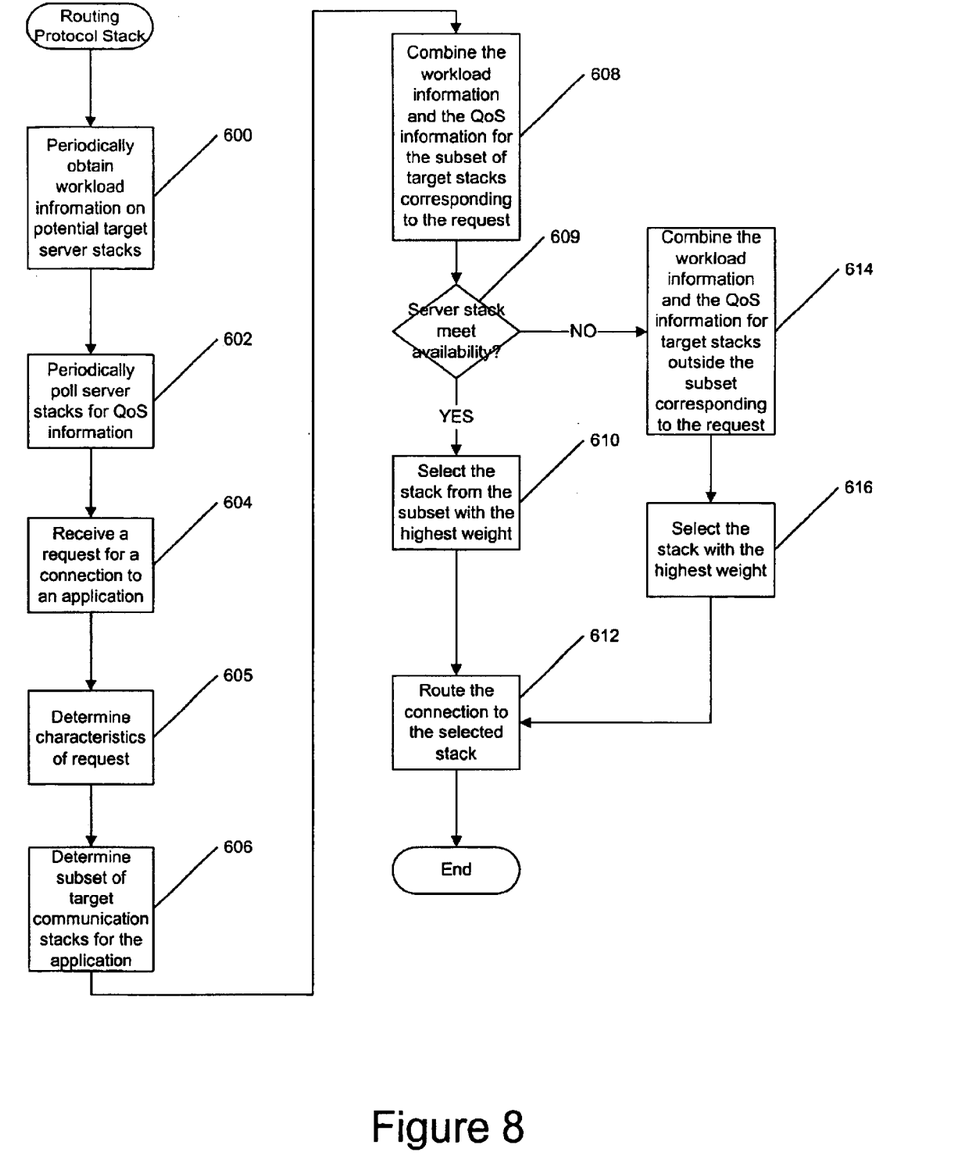
FIG. 8 is a flowchart illustrating operations of a routing protocol stack according to embodiments of the present invention.

As seen in FIG. 8, the workload distribution function 25 of routing communication protocol stacks, such as the communication protocol stacks 22 and 38, periodically obtains workload information from OS/390 WLM utilizing conventional Sysplex communication techniques (block 600). This information may take the form of a workload weight (W) associated with each server communication protocol stack for which the communication protocol stacks 22 and 38 function as routing communication protocol stacks. The weight may, for example, be a value between 0 and 64 with 64 representing the highest available processing capacity.

The workload distribution function 25 of the routing communication protocol stacks 22 and 38 also periodically poll the other communication protocol stacks to obtain QoS information from the server communication protocol stacks (block 602). Such a poll may be individually addressed to the server communication protocol stacks or may be broadcast. Polling may utilize XCF messaging and the coupling facility 40 for communication between the communication protocol stacks. The QoS information may be provided by the policy agents 27 of the server communication protocol stacks or by the workload distribution function 25 if the stack is both a server stack and a routing stack. Furthermore, if the stack is both a server stack and a routing stack, the polling of itself may not involve external communications.

The workload information and the QoS information may be obtained for only communication protocol stacks for which a communication protocol stack functions as a routing communication protocol stack or for all communication protocol stacks in the Sysplex. A communication protocol stack knows if it is a routing communication protocol stack as a result of the DVIPA initialization described in commonly assigned U.S. patent application Ser. No. 09/640,412, entitled, "METHODS, SYSTEMS AND COMPUTER PROGRAM PRODUCTS FOR NON-DISRUPTIVELY TRANSFERRING A VIRTUAL INTERNET PROTOCOL ADDRESS BETWEEN COMMUNICATION PROTOCOL STACKS", U.S. patent application Ser. No. 09/640,409, entitled "METHODS, SYSTEMS AND COMPUTER PROGRAM PRODUCTS FOR CLUSTER WORKLOAD DISTRIBUTION", U.S. patent application Ser. No. 09/640,438, entitled "METHODS, SYSTEMS AND COMPUTER PROGRAM PRODUCTS FOR FAILURE RECOVERY FOR ROUTED VIRTUAL INTERNET PROTOCOL ADDRESSES" all filed Aug. 17, 2000, and U.S. patent application Ser. No. 09/401,419 entitled "METHODS, SYSTEMS AND COMPUTER PROGRAM PRODUCTS FOR AUTOMATED MOVEMENT OF IP ADDRESSES WITHIN A CLUSTER" filed Sep. 22, 1999.

For example, the communication protocol stacks 22 and 38, which are designated as routing protocol stacks as they have connections to the network 44 and include VIPADIS-Tribute statements in the VIPADynamic block, publish the distribution information through messages broadcast by the VIPA distribute function 23 of each of the communication protocol stacks 22, 26, 30, 34 and 38 to the other communication protocol stacks 22, 26, 30, 34 and 38. At initialization or profile changes, the communication protocol stacks 22, 26, 30, 34 and 38 communicate to all partner communication protocol stacks the complete list of dynamic routable VIPAs, their associated ipAddrList and portlist and the primary and backup definitions for the communication protocol stack. When a communication protocol stack 22, 26, 30, 34 and 38 receives the DVIPA information it notes if it is identified as a candidate target protocol stack or as a backup stack. If the protocol stack is a candidate target stack, the protocol stack monitors applications associated with the protocol stack and sends a message to the defined routing stack when an application instance is bound to the DVIPA and listens on a defined port. Thus, each routing communication protocol stack is aware of each communication protocol stack for which it routes DVIPAs.

Returning to FIG. 8, when a routing communication protocol stack receives a request for a connection to an application (block 604), the routing communication protocol stack determines the characteristics of the received request (block 605). The routing communication protocol stack determines the subset of the potential target communication protocol stacks for the connection based on the characteristics of the request (block 606) and determines a workload metric for the subset of potential target communication protocol stacks (block 608).

Thus, in the present example, when a connection request is made to DVIPA VA1 to connect to APP A, the communication protocol stack 22 evaluates the client making the request and if the client is in a list of clients associated with the subset of communication protocol stacks, the communication protocol stack 22 obtains the workload information W and QoS information for MVS1 and MVS2. This information is used to determine the workload metrics for the candidate target protocol stacks in the subset of potential target communication protocol stacks. The workload metric may, optionally, be evaluated to determine if a stack in the subset of stacks meets a performance or availability criteria (e.g., is the workload metric above a threshold value)(block 609). If so, the workload metric may, for example, combine the QoS information and the workload information to select the stack in the subset of stacks with the best relative performance (e.g., highest weight)(block 610).

If no stack in the subset of stacks meets the performance or availability criteria (block 609), then the workload metric is determined for the other potential target communication protocol stacks (block 614). In the present example, the workload metric would be determined for MVS4. The workload metrics for all of the potential target communication protocol stacks could then be evaluated to select the stack with best workload metric (e.g. highest value) from all of the communication protocol stacks (block 616). Alternatively, the workload metrics for the stacks outside the subset could be compared to the availability criteria and only selected if they met the availability criteria. Otherwise a stack with the best workload metric from the subset of stacks would be selected. In either case, the requested connection is routed to the selected stack (block 612).

Alternatively, if no stack in the subset of stacks meets the performance or availability criteria (block 609), the request could be rejected. In such embodiments, the operations of blocks 614 and 616 could be eliminated and the "NO" path from block 609 could be connected to block 612. With no server stack selected, then the connection would not be routed to any stack and would be rejected (block 612).

The combination of the QoS information and the workload information may be as described in concurrently filed and commonly assigned U.S. patent application Ser. No. 09/693,663, entitled "METHODS, SYSTEMS AND COMPUTER PROGRAM PRODUCTS FOR WORKLOAD DISTRIBUTION BASED ON END-TO-END QUALITY OF SERVICE".

Embodiments of the present invention have been described with reference to FIGS. 4 through 8 which are block diagrams and flowchart illustrations of operations of protocol stacks incorporating embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and/or block diagrams support combinations of means for performing the specified functions, combinations of steps for performing the specified functions and program instructions for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

While the present invention has been described with respect to the workload distribution function as a part of the communication protocol stack, as will be appreciated by those of skill in the art, such functions may be provided as separate functions, objects or applications which may cooperate with the communication protocol stacks. Furthermore, the present invention has been described with reference to particular sequences of operations. However, as will be appreciated by those of skill in the art, other sequences may be utilized while still benefitting from the teachings of the present invention. Thus, while the present invention is described with respect to a particular division of functions or sequences of events, such divisions or sequences are merely illustrative of particular embodiments of the present invention and the present invention should not be construed as limited to such embodiments.

Furthermore, while the present invention has been described with reference to particular embodiments of the present invention in a System/390 environment, as will be appreciated by those of skill in the art, the present invention may be embodied in other environments and should not be construed as limited to System/390 but may be incorporated into other systems, such as a Unix or other environment, for example, by associating applications or groups of applications with an address rather than a communications adapter. Thus, the present invention may be suitable for use in any collection of data processing systems which allow sufficient communication to all systems for the use of dynamic virtual addressing. Accordingly, specific references to System/390 systems or facilities, such as the "coupling facility," "ESCON," "Sysplex" or the like should not be construed as limiting the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of distributing workload between a plurality of data processing systems in a cluster of data processing systems, wherein each of the plurality of data processing systems is executing an instance of an application which communicates over a network such that a connection request to the application may be distributed to any one of the plurality of data processing systems, the method comprising:

defining a subset of the plurality of data processing systems which are to receive connection requests to the application having at least one predefined characteristic;

receiving a request for a connection to the application over the network;

determining if the received request has a characteristic other than identification of the application corresponding to the at least one predefined characteristic associated with the subset of the plurality of data processing systems; and distributing the received request to one of the subset of the plurality of data processing systems if the received request is for a connection to the application over the network and has a characteristic corresponding to the at least one predefined characteristic.

2. A method according to claim 1, further comprising the step of distributing the request to a data processing system of the plurality of data processing systems other than a data processing system in the subset of data processing systems if the request does not have a characteristic corresponding to the at least one predefined characteristic.

3. A method according to claim 1, wherein the characteristic comprises a client identification associated with the request.

4. A method according to claim 1, further comprising the steps of:

determining the availability of data processing systems in the subset of the plurality of data processing systems; and determining if the availability of at least one of the data processing systems in the subset of the plurality of data processing systems meets an availability criteria; and wherein the step of distributing the request to one of the subset of the plurality of data processing systems if the request is for a connection to the application over the network and has a characteristic corresponding to the at least one predefined characteristic of the subset of the plurality of data processing systems comprises distributing the request to at least one of the data processing systems in the subset of the plurality of data processing systems which meets the availability criteria if it is determined that at least one of the data processing systems in the subset of the plurality of data processing systems meets the availability criteria.

5. A method according to claim 4, further comprising the step of distributing the request to a data processing system of the plurality of data processing systems other than a data processing system in the subset of data processing systems if the request has a characteristic corresponding to the at least one predefined characteristic of the subset of the plurality of data processing systems and at least one of the subset of the plurality of data processing systems does not have an availability which meets the availability criteria.

6. A method according to claim 4, further comprising the step of rejecting the request if the request has a characteristic corresponding to the at least one predefined characteristic of the subset of the plurality of data processing systems and at least one of the subset of the plurality of data processing systems does not have an availability which meets the availability criteria.

7. A method according to claim 4, further comprising the steps of:

determining an availability of data processing systems other than data processing systems in the subset of data processing systems; and distributing the request to a data processing system of the plurality of data processing having the best availability if the request has a characteristic corresponding to the at least one predefined characteristic of the subset of the plurality of data processing systems and at least one of the subset of the plurality of data processing systems does not have an availability which meets the availability criteria.

8. A method according to claim 1, wherein the step of defining a subset of the plurality of data processing systems comprises the step of including in the subset of the plurality of data processing systems, data processing systems having common operational characteristics.

9. A method according to claim 1, wherein the data processing systems comprise communication protocol stacks bound to the application in an OS/390 Sysplex and wherein the subset of the plurality of data processing systems comprise a subset of the communication protocol stacks bound to the application.

10. A method according to claim 9, wherein the steps of defining, receiving, determining and distributing are carried out by a routing communication protocol stack.

11. A system distributing workload between a plurality of data processing systems in a cluster of data processing systems, wherein each of the plurality of data processing systems is executing an instance of an application which communicates over a network such that a connection request to the application may be distributed to any one of the plurality of data processing systems, comprising:

means for defining a subset of the plurality of data processing systems which are to receive connection requests to the application having at least one predefined characteristic;

means for receiving a request for a connection to the application over the network;

means for determining if the received request has a characteristic other than identification of the application corresponding to the at least one predefined characteristic associated with the subset of the plurality of data processing systems; and means for distributing the received request to one of the subset of the plurality of data processing systems if the received request is for a connection to the application over the network and has a characteristic corresponding to the at least one predefined characteristic.

12. A system according to claim 11, further comprising means for distributing the request to a data processing system of the plurality of data processing systems other than a data processing system in the subset of data processing systems if the request does not have a characteristic corresponding to the at least one predefined characteristic.

13. A system according to claim 11, wherein the characteristic comprises a client identification associated with the request.

14. A system according to claim 11, further comprising:

means for determining the availability of data processing systems in the subset of the plurality of data processing systems; and means for determining if the availability of at least one of the data processing systems in the subset of the plurality of data processing systems meets an availability criteria; and wherein the means for distributing the received request to one of the subset of the plurality of data processing systems if the received request is for a connection to the application over the network and has a characteristic corresponding to the at least one predefined characteristic of the subset of the plurality of data processing systems comprises means for distributing the request to at least one of the data processing systems in the subset of the plurality of data processing systems which meets the availability criteria if it is determined that at least one of the data processing systems in the subset of the plurality of data processing systems meets the availability criteria.

15. A system according to claim 14, further comprising means for distributing the request to a data processing system of the plurality of data processing systems other than a data processing system in the subset of data processing systems if the request has a characteristic corresponding to the at least one predefined characteristic of the subset of the plurality of data processing systems and at least one of the subset of the plurality of data processing systems does not have an availability which meets the availability criteria.

16. A system according to claim 14, further comprising means for rejecting the request if the request has a characteristic corresponding to the at least one predefined characteristic of the subset of the plurality of data processing systems and at least one of the subset of the plurality of data processing systems does not have an availability which meets the availability criteria.

17. A system according to claim 14, further comprising:

means for determining an availability of data processing systems other than data processing systems in the subset of data processing systems; and means for distributing the request to a data processing system of the plurality of data processing having the best availability if the request has a characteristic corresponding to the at least one predefined characteristic of the subset of the plurality of data processing systems and at least one of the subset of the plurality of data processing systems does not have an availability which meets the availability criteria.

18. A system according to claim 11, wherein the means for defining a subset of the plurality of data processing systems comprises means for including in the subset of the plurality of data processing systems, data processing systems having common operational characteristics.

19. A system according to claim 11, wherein the data processing systems comprise communication protocol stacks to which the application is bound in an OS/390 Sysplex and wherein the subset of the plurality of data processing systems comprise a subset of the communication protocol stacks bound to the application.

20. A system according to claim 19, wherein the means for defining, means for receiving, means for determining and means for distributing comprise a routing communication protocol stack.

21. A computer program product of distributing workload between a plurality of data processing systems in a cluster of data processing systems, wherein each of the plurality of data processing systems is executing an instance of an application which communicates over a network such that a connection request to the application may be distributed to any one of the plurality of data processing systems, comprising:

a computer readable storage medium having computer readable program code embodied therein, the computer readable program code comprising:

computer readable program code which defines a subset of the plurality of data processing systems which are to receive connection requests to the application having at least one predefined characteristic;

computer readable program code which receives a request for a connection to the application over the network;

computer readable program code which determines if the received request has a characteristic other than identification of the application corresponding to the at least one predefined characteristic associated with the subset of the plurality of data processing systems; and computer readable program code which distributes the received request to one of the subset of the plurality of data processing systems if the received request is for a connection to the application over the network and has a characteristic corresponding to the at least one predefined characteristic.

22. A computer program product according to claim 21, further comprising computer readable program code which distributes the request to a data processing system of the plurality of data processing systems other than a data processing system in the subset of data processing systems if the request does not have a characteristic corresponding to the at least one predefined characteristic.

23. A computer program product according to claim 21, wherein the characteristic comprises a client identification associated with the request.

24. A computer program product according to claim 21, further comprising:

computer readable program code which determines the availability of data processing systems in the subset of the plurality of data processing systems; and computer readable program code which determines if the availability of at least one of the data processing systems in the subset of the plurality of data processing systems meets an availability criteria; and wherein the computer readable program code which distributes the received request to one of the subset of the plurality of data processing systems if the received request is for a connection to the application over the network and has a characteristic corresponding to the at least one predefined characteristic of the subset of the plurality of data processing systems comprises computer readable program code which distributes the request to at least one of the data processing systems in the subset of the plurality of data processing systems which meets the availability criteria if it is determined that at least one of the data processing systems in the subset of the plurality of data processing systems meets the availability criteria.

25. A computer program product according to claim 24, further comprising computer readable program code which distributes the request to a data processing system of the plurality of data processing systems other than a data processing system in the subset of data processing systems if the request has a characteristic corresponding to the at least one predefined characteristic of the subset of the plurality of data processing systems and at least one of the subset of the plurality of data processing systems does not have an availability which meets the availability criteria.

26. A computer program product according to claim 24, further comprising computer readable program code which rejects the request if the request has a characteristic corresponding to the at least one predefined characteristic of the subset of the plurality of data processing systems and at least one of the subset of the plurality of data processing systems does not have an availability which meets the availability criteria.

27. A computer program product according to claim 24, further comprising:

computer readable program code which determines an availability of data processing systems other than data processing systems in the subset of data processing systems; and computer readable program code which distributes the request to a data processing system of the plurality of data processing having the best availability if the request has a characteristic corresponding to the at least one predefined characteristic of the subset of the plurality of data processing systems and at least one of the subset of the plurality of data processing systems does not have an availability which meets the availability criteria.

28. A computer program product according to claim 21, wherein the computer readable program code which defines a subset of the plurality of data processing systems comprises means for including in the subset of the plurality of data processing systems, data processing systems having common operational characteristics.

29. A computer program product according to claim 21, wherein the data processing systems comprise communication protocol stacks to which the application is bound in an OS/390 Sysplex and wherein the subset of the plurality of data processing systems comprise a subset of the communication protocol stacks bound to the application.

30. A computer program product according to claim 29, wherein the computer readable program code which defines, computer readable program code which receives, computer readable program code which determines and computer readable program code which distributes comprise computer readable program code which provides a routing communication protocol stack.

* * * * *